Patented Sept. 19, 1950

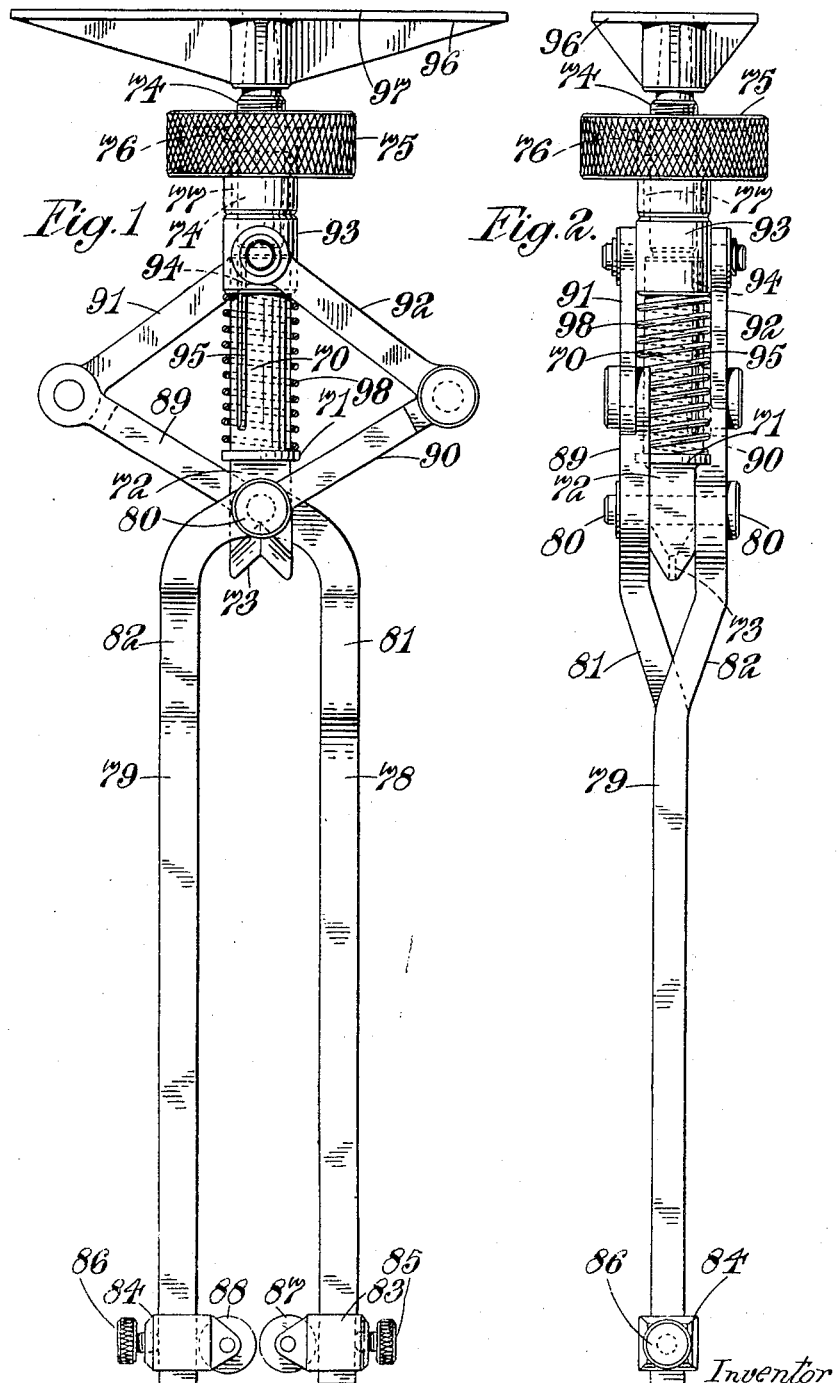

2,523,226

UNITED STATES PATENT OFFICE 2,523,226

GAUGE FOR AIRFOILS

Harry Lawley Milner, Cheltenham, England, assignor to Rotol Limited, Gloucester, England, a British company Application October 22, 1945, Serial No. 623,819
In Great Britain October 12, 1943

Section 1, Public Law 690, August 8, 1946
Patent expires October 12, 1963

4 Claims. (Cl. 33—174)

This invention relates to gauges for aerofoils and has for its object to provide a gauge of the type described in the specification of my application for United States Letters Patent Serial No. 464,087, now Patent 2,402,567 granted June 25, 1946, but which is simpler in construction and use, and of lighter weight. The improved gauge is suitable for use in the integrating apparatus described in the specification of my application for United States Letters Patent No. 464,088, now Patent 2,400,942 granted May 28, 1946, or the modifications thereof described in the specification of my application for United States Letters Patent Serial No. 623,818 (corresponding to British No. 16,751/43).

According to this invention, the improved gauge comprises a main member formed with an abutment to engage and be located by the trailing edge of the section of the blade at the station selected, a pair of scissor-members pivotally mounted on said member, contact-members mounted adjustably on the long arms of said scissor-members, a pair of links connected respectively to the short arms of said scissor-members and to a sleeve adapted to slide on the main member aforesaid, a compression spring operative on said sleeve to close the arms of said scissor-members, a nut screw-threaded on the main member to open said scissor-members against the action of the spring, and a surface on said main member which bears a definite angular relationship, for example is normal, to the line bisecting the angle between the said scissor-members and passing through their pivot point.

In the accompanying drawings which illustrate one embodiment of this invention, Figures 1 and 2 are front and side elevations respectively of the complete device.

Referring to the drawings, the main member of this gauge is of cylindrical form as shown at 70, formed near one end with a shoulder 71 and with a flat plate-like extension 72 beyond the shoulder. At the end of the part 72 there is formed a V-notch 73 to engage and be located by the trailing edge of an airscrew-blade when the gauge is applied to it. The notch 73 does not extend with its apex straight across the plate-like part 72, but has its two ends sloped so as to provide substantially point contact on the centre line of the member 70.

The other end of the member 70 is screw-threaded at 74 to receive a milled nut 75 which is screw-threaded at 76 to engage the thread 74, and is formed with a recess 77 to enable the nut when it is screwed down to pass over the cylindrical part 70 if necessary.

On the end of the member 70 beyond the screw-threaded part 74 there is rigidly secured a plate 96 which is formed with its upper surface 97 accurately at right-angles to the longitudinal axis of the member; this plate 96 is used to support an optical projection device resting or secured on it.

A pair of scissor-like elements 78, 79 are pivotally mounted one on each side of the plate-like extension 72 by means of a pivot pin 80, and these members are cranked as shown at 81, 82 in Figure 2 so that their longer members lie opposite one another. On each of these arms there is mounted a contact-member 83, 84 respectively so as to be adjustable lengthwise of the arm, being retained in any desired position by locking screws 85, 86. These members 83, 84 carry rollers shown respectively at 87, 88 to engage the front and rear faces of the blade.

The short arms 89, 90 of the scissor-members 78, 79 which lie on the other side of the pivot pin 80 are connected by pivot links 91, 92 to a sleeve-member 93 which is slidable on the main member 70, being prevented from rotation thereon by a key 94 engaging a key-way 95.

A compression-spring 98 is mounted between the shoulder 71 and the sleeve 93 so as normally to force them apart, and by means of the links 91, 92 to press the rollers 87, 88 aforesaid towards one another. The position of the sleeve 93 is adjusted by means of the nut-member 75.

In the use of this device the nut-member 75 is turned so as to open out the scissor-members 78, 79, and the gauge is then applied to an airscrew-blade at the desired position thereon. The contact-members 83, 84 are adjusted so that the rollers 87, 88 engage the front and rear surfaces of the blade at approximately the mid point of the chord of that section of the blade to which they are applied, and the nut-member 75 is then turned to close the rollers on to the blade. Since these rollers move at the same rate towards and away from one another, the axial line of the main member which passes through the centre of the V-notch 73 aforesaid bisects the angle between the arms 78, 79 and therefore passes through the point midway between the contact-members 83, 84. This line then indicates with a considerable degree of accuracy the line of zero-lift at that section of the blade. The plate 96 which is accurately at right-angles to this axial line therefore assumes a corresponding position, its angular setting with respect to some datum being indicated by the optical projection device which is mounted on the plate-member.

The above described construction of gauge offers the advantage that the clamping pressure of the contact-members on the surface of the blade is effected by the spring, and such pressure remains more or less constant for all stations along the blade, since with most forms of airscrew-blade, the thickest sections of the blade also have the greater chord, so that the contact-members are spaced further away from the pivot point of the scissors element and thereby compensate for the increased compression of the spring when the elements are opened to accommodate the thicker section. This equality of clamping pressure assists in obtaining accurate measurement of the zero-lift angle of the propeller-blades.

Also this construction of gauge can be made of substantially less weight than the particular forms described in my earlier specification aforesaid so that any tendency for the weight of the gauge to distort the blade is minimised.

Whilst this gauge is particularly suitable for use with the integrating apparatus above mentioned, it is to be understood that it is not restricted for use therewith, since it may be used for direct measurement of the angle of the zero-lift line by a suitable clinometer or other device attached to the plate-like portion on the end of the gauge.

I claim:

1. A gauge for an airfoil comprising in combination, a main member having one end formed with a V-notch-abutment to engage and to be located on the trailing edge of an airfoil, a pivot on said member spaced along it from said abutment, a pair of scissor-members hinged on said pivot, each scissor member comprising a long arm and a short arm, whereof the long arms extend from the pivot beyond said abutment symmetrically about the line joining the center of said pivot and bottom of the notch of said abutment, a contact-member on each long arm adjustable therealong, a sleeve slidable on said main member in the direction of the said line, a pair of links each connected at one end to said sleeve, and pivotally connected at their other ends respectively to the short arms of said scissor-members, a nut screw-threaded on said main member and engaging said sleeve to adjust it therealong, and a surface on said main member bearing a definite angular relationship with the direction of the line aforesaid joining the pivot and the abutment.

2. A gauge for an airfoil according to claim 1, including a spring on the main member pressing the said sleeve against the said nut in the direction to close the long arms towards one another.

3. A gauge for an airfoil according to claim 1 having the said surface on the main member at right-angles to the line joining the said abutment and the said pivot on the member.

4. A gauge for an airfoil comprising in combination, a main member having one end formed with a V-notch-abutment to engage and to be located on the trailing edge of an airfoil, a pivot on said member spaced along it from said abutment, a pair of scissor-members hinged on said pivot, each scissor member comprising a long arm and a short arm, whereof the long arms extend from the pivot beyond said abutment symmetrically about the line joining the center of said pivot and the bottom of the notch of said abutment, a contact-member on each long arm adjustable therealong, a sleeve slidable on said main member in the direction of the said line, a pair of links each connected at one end to said sleeve, and pivotally connected at their other ends respectively to the short arms of said scissor-members, a shoulder carried by said main member between said slidable sleeve and said pivot spaced along said main member, and a spring slidable over said main member one end of which abuts said shoulder and the other end of which abuts said sleeve for normally biasing said scissor members to a closed position, said main member having a keyway therein, said sleeve member having a keyway therein, a key in said key-way for prohibiting rotational movement of said slidable sleeve about said main member, a nut screw-threaded on said main member and engaging said sleeve to adjust it therealong, and a surface on said main member bearing a definite angular relationship with the direction of the line aforesaid joining the pivot and the abutment.

HARRY LAWLEY MILNER.

REFERENCES CITED

The following references are of record in the file of this patent:

UNITED STATES PATENTS

| Number | Name | Date |
| --- | --- | --- |
| 115,337 | McNiel | May 30, 1871 |
| 433,869 | Laursen | Aug. 5, 1890 |
| 1,367,765 | Bengtsson | Feb. 8, 1921 |
| 1,630,505 | Walther | May 31, 1927 |
| 2,086,402 | Countryman | July 6, 1937 |
| 2,402,567 | Milner | June 25, 1946 |

FOREIGN PATENTS

| Number | Country | Date |
| --- | --- | --- |
| 304,063 | Germany | Feb. 26, 1918 |
| 579,772 | Great Britain | Aug. 15, 1946 |